United States Patent [19]

Kaieda et al.

[11] 4,161,678

[45] Jul. 17, 1979

[54] SERVO-SYSTEM

[75] Inventors: Nobuo Kaieda; Kenji Kawakami; Yoshihiro Okano; Hiroshi Ohtsu, all of Musashino, Japan

[73] Assignee: Yokogawa Electric Works, Ltd., Tokyo, Japan

[21] Appl. No.: 738,736

[22] Filed: Nov. 4, 1976

[30] Foreign Application Priority Data

Nov. 13, 1975 [JP] Japan .............................. 50-154456[U]
Nov. 13, 1975 [JP] Japan .............................. 50-154458[U]
Nov. 13, 1975 [JP] Japan .............................. 50-154459[U]

[51] Int. Cl.² ........................................... G05D 23/00
[52] U.S. Cl. .................................... 318/641; 318/677;
　　　　　　　318/679; 318/681; 318/684; 318/678
[58] Field of Search ................ 318/677, 678, 679, 681,
　　　　　　　318/684, 668, 641; 324/99 R

[56] References Cited

U.S. PATENT DOCUMENTS

| | | | |
|---|---|---|---|
| 3,172,025 | 3/1965 | Jones et al. | 318/681 |
| 3,267,374 | 8/1966 | McAdam et al. | 324/99 R |
| 3,281,685 | 10/1966 | Talbot, Jr. | 318/668 |
| 3,317,833 | 5/1967 | Miller | 318/629 |
| 3,628,129 | 12/1971 | Riley | 318/678 |
| 3,697,871 | 10/1972 | Macmullan | 318/678 |
| 3,866,103 | 2/1975 | Maezawa et al. | 318/678 |

Primary Examiner—Gene Z. Rubinson
Assistant Examiner—Eugene S. Indyk
Attorney, Agent, or Firm—Parmelee, Johnson, Bollinger & Bramblett

[57] ABSTRACT

A servo-system is provided for self-balancing systems using an ac servomotor capable of maintaining loop gain substantially constant irrespective of span adjustment and without capacitor coupling. It includes a direct-coupling dc amplifier for comparing input and comparison signals and amplifying the result, a servo amplifier having a differential direct-coupling amplifier with inverting and non-inverting input terminals, with feedback from its output to the inverting input terminal and a switch to the non-inverting input terminal operating at the same frequency as the ac power source for the servomotor, to maintain the loop gain constant irrespective of span adjustment, and means causing the ac servomotor to move a slide resistor to bring the compared signal into balance with the input signal.

Provision is also made for receiving input signals from thermoelectric or resistance thermometers and balancing the system using these signals.

7 Claims, 11 Drawing Figures

SERVO-SYSTEM

BACKGROUND OF THE INVENTION

1. Field of the Invention

The present invention relates to servo-systems used in self-balancing instruments, and more particularly to servo-systems using an ac servomotor. They are of a type which may be used in feedback thermocouple or resistance thermometers.

2. Description of the Prior Art

In servo-systems of the type using an ac servomotor a dc deviation signal between the input signal and the compared signal is converted into an ac signal by a chopper and then amplified by an ac amplifier; the ac servomotor is driven by the amplified signal, and the brush of the slide resistor of the compared value generator is displaced, thus causing the dc deviation signal to be zero-balanced.

In such systems, the chopper is coupled to the ac amplifier through a coupling capacitor. When a capacitor is associated with the servo loop, however, the servo loop is liable to become unstable due to a phase shift by the capacitor.

In recent servo-systems such as that disclosed in U.S. Pat. No. 3,866,103 to Maezawa, et al., an increasing number of linear IC's have come to be used as amplifiers. The linear IC is a direct-coupling amplifier; hence it is operated in such manner that a negative feedback is effected in dc and low frequency ranges to lower its gain and thereby to operate the amplifier for normal ac amplifying functions. This necessitates a high frequency bypass filter for the feedback circuit of the linear IC amplifier, with the result that circuit construction becomes intricate and the servo loop tends to operate unstably due to a phase shift by the capacitor.

Furthermore, in this type of servo-system, the input signal variable range is wide; for example, in a self-balancing instrument, the input span ranges from a minimum of 5 mV to a maximum of 25 V, that is, the maximum span is often greater than the minimum span by a factor of $10^3$.

In prior art circuits a voltage derived from the slide resistor through a span adjusting voltage divider is used as the compared value, thereby making it possible for the input span to correspond to 0 to 100% points on the slide resistor.

In a practical circuit, a change in the ratio of the voltage divider for span adjustment will vary the loop gain of the servo loop, which variation may be great especially in a self-balancing instrument. However, it is desirable that the loop gain of a servo loop be constant, because the nonlinearity and transfer function of the servo loop are in a dynamic system. In span adjustment by prior art, therefore, the gain of the servo amplifier has had to be manually adjusted with care not to affect the loop gain at the sacrifice of extra adjusting efforts and increase in the number of circuit elements.

This type of servo-system is often used for a thermoelectric thermometer using a thermocouple and for a resistance thermometer using a resistance bulb. In applications to the former, it is desirable that the thermocouple output be automatically compensated for by an electrical signal which corresponds to the temperature at the cold junction because the thermocouple generates a thermal emf corresponding to the difference between the temperature detected at the hot junction and that at the cold junction. In applications to the latter, changes in the resistance of the bulb should be as linear as possible although such resistance changes tend to be nonlinear against temperatures detected at the hot junction. It is also desirable that the resistance thermometer be free of the resistance of the lead wire from the resistance bulb because the lead wire resistance often serves as a source of error in measurements.

SUMMARY OF THE INVENTION

This invention provides a servo-system for self-balancing instruments using an ac servomotor. Capacitor coupling, with attendant possible phase change is avoided, and the system is operated using a dc signal that is not chopped. Loop gain is maintained substantially constant irrespective of span adjustments.

Following a buffer amplifier, a direct coupling dc amplifier is used to compare and amplify input and comparison signals. A servo amplifier directly receives this output of the dc amplifier through inverting and non-inverting input terminals. There is feedback from its output to the inverting input terminal. The servo amplifier output is chopped so that the amplifier output can operate an ac servomotor by use of a switching FET gated by a signal of the same frequency as that of the ac power supply to the servomotor. A potentiometer with a slide resistor moved by the servomotor is used to bring the compared signal into balance with the input signal.

Provision is made for using input signals from thermoelectric or resistence thermometers and for adjusting them to provide accurate readout.

Further objects, features and advantages of the invention will become more apparent from the following detailed description when read in conjunction with the accompanying drawings, wherein:

DESCRIPTION OF THE PREFERRED EMBODIMENT

Figure 1:
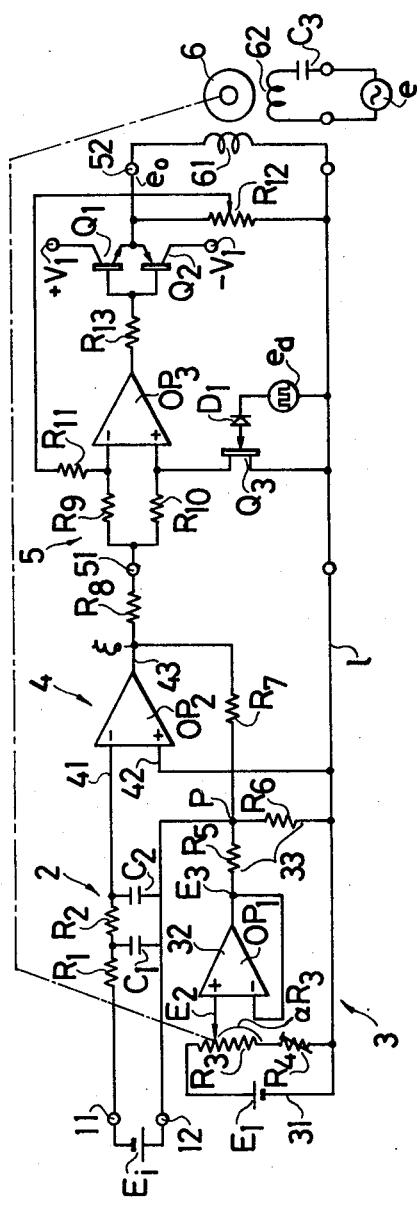
FIG. 1 is a circuit diagram showing a simple embodiment of the servo-system of the invention.

FIG. 1 shows a servo-system of the invention. It includes terminals 11 and 12 across which a dc input signal voltage $E_i$ is applied, a filter 2 formed of resistors $R_1$, $R_2$ and capacitors $C_1$, $C_2$, and a compared value generator 3 formed of a potentiometer 31, a buffer amplifier 32 and a span adjusting voltage divider 33.

Potentiometer 31 comprises a stabilized dc source $E_1$, a slide resistor $R_3$, and a zero adjusting resistor $R_4$.

Buffer amplifier 32 is a voltage follower using a linear IC OP$_1$; it has an input supplied with a voltage E$_2$ from the potentiometer 31 and generates an output through impedance conversion.

Voltage divider 33 includes resistors R$_5$ and R$_6$ and divides the output E$_3$ of the buffer amplifier 32, thereby causing the range of input signal voltage E$_i$ to correspond to a 0 to 100% scale length travelled by the brush on the slide resistor R$_3$. In the voltage divider 33, the resistance of resistor R$_6$ is made variable and that of resistor R$_5$ fixed, to make span adjustment. The voltage dividing point P between R$_5$ and R$_6$ is connected to the positive input terminal 12.

The servo-system further comprises a high gain, direct-coupling dc amplifier 4 constituted of a linear IC OP$_2$, which has an inverting input terminal 41 connected to the signal input terminal 11 via resistors R$_1$ and R$_2$ of the filter 2 and has a non-inverting input terminal 42 connected to a common line 1. The dc amplifier 4 has its ouput terminal 43 connected to the voltage dividing point P of the voltage divider 33 via a resistor R$_7$, and the amplifier output $\epsilon$ is fed back through the voltage divider 33.

The servo-system has a servo amplifier 5 which comprises a linear IC OP$_3$, complementary transistors Q$_1$ and Q$_2$ directly coupled to the linear IC OP$_3$, and a switching field effect transistor (FET) Q$_3$. The servo amplifier 5 has an input terminal 51 connected through a resistor 8 to the output terminal 43 of the dc amplifier 4 and also to the inverting input terminal (−) and the non-inverting input terminal (30) of the linear IC OP$_3$ via resistors R$_9$ and R$_{10}$ respectively. The linear IC OP$_3$ has its output terminal connected to the common base of transistors Q$_1$ and Q$_2$ via a resistor R$_{13}$. The transistors Q$_1$ and Q$_2$ have their emitters commonly connected to the output terminal 52 of the servo amplifier 5, which is connected through a variable resistor R$_{12}$ to the common line 1.

The brush of the variable resitor R$_{12}$ is connected through a resistor R$_{11}$ to the inverting input terminal (−) of OP$_3$ whereby a negative feedback is effected. This negative feedback contributes to sufficiently lowering the output impedance of the servo amplifier 5. The collectors of transistors Q$_1$ and Q$_2$ are supplied with dc voltages +V$_1$ and −V$_1$ respectively.

The FET Q$_3$ is connected between the non-inverting input terminal (30) of the linear IC OP$_3$ and common line 1. The FET Q$_3$ serves as a switch capable of repeating on-off by a drive signal e$_d$ applied to its gate via a diode D$_1$, the frequency of the signal e$_d$ being the same as that of the ac power supply e.

The servo-system further comprises an ac 2-phase servo motor 6 which has a control coil 61 connected between the output terminal 52 of servo amplifier 5 and the common line 1, and an excitation coil 62 connected to the ac power supply e via a phase shifting capacitor C$_3$. The rotating shaft of the ac servo motor 6 is coupled to the brush of the slide resistor R$_3$ and also to an indicating recording mechanism (not shown) to drive such mechanism.

In this servo-system, the output $\epsilon$ of the dc amplifier 4 can be expressed by Eq. (1) below as long as the resistances of resistor R$_5$, R$_6$ and R$_7$ are determined as R$_5$, R$_6$<<R$_7$ where the gain of the dc amplifier 4 is large enough.

$$\epsilon \approx \frac{R_5 R_6}{R_5 R_6} \cdot R_7(E_i - E_f) \tag{1}$$

where $E_f = \frac{R_6}{R_5 + R_6} E_3 = \frac{R_6}{R_5 + R_6} E_2$

Thus the output $\epsilon$ is proportional to the difference between the dc input signal voltage E$_i$ and the compared voltage E$_f$. The gain of the dc amplifier 4 depends on the value (R$_5$+R$_6$)/(R$_5$R$_6$)(R$_7$) or varies according to the value of the span adjusting resistor R$_6$.

The loop gain $\mu\beta$ of the servo loop is given as follows where G denotes a gain for the compared voltage E$_f$ generated by way of the servo amplifier 5 and the ac servo motor 6.

$$\mu\beta = \frac{R_5 + R_6}{R_5 R_6} R_7 \cdot G \frac{R_6}{R_5 + R_6} = \frac{R_7}{R_5} G \tag{2}$$

In Eq. (2), the resistors R$_5$ and R$_7$ do not change their resistance values in span adjustment and hence the loop gain $\mu\beta$ of the servo loop is kept constant without the need for adjusting the gain of the servo amplifier 5 in span adjustment. In other words, the servo amplifier 5 may be one whose gain is constant.

Figure 3:
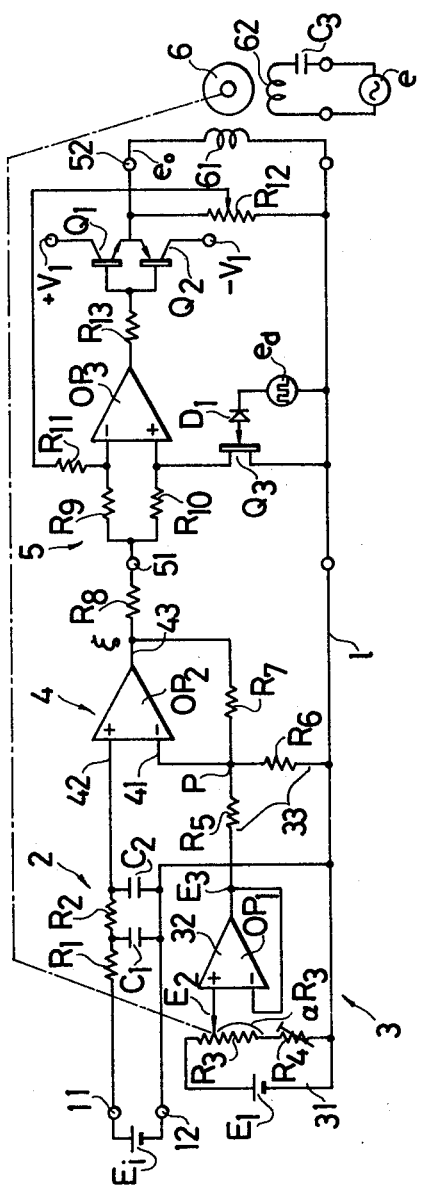
FIGS. 3 to 5 are circuit diagrams showing the embodiment of servo-systems of the invention.
Figure 4:
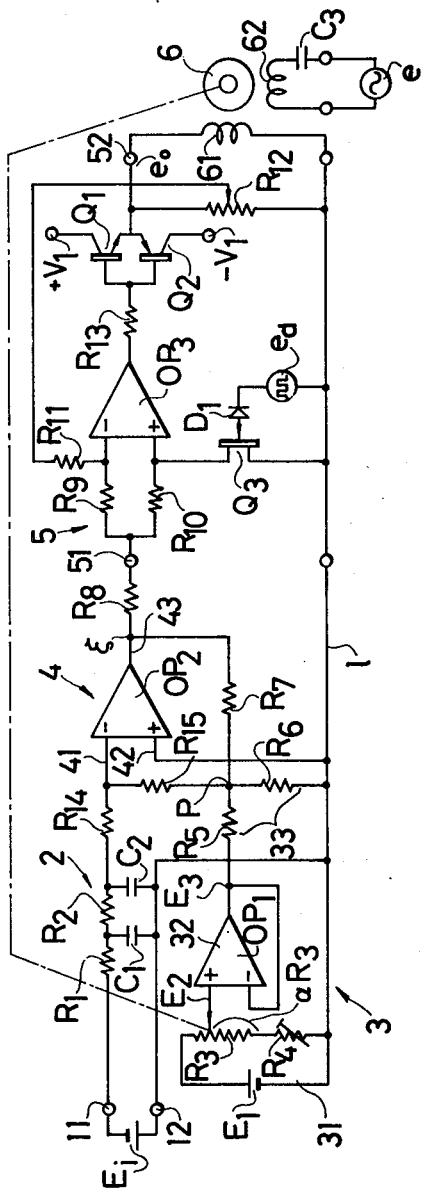
Figure 5:
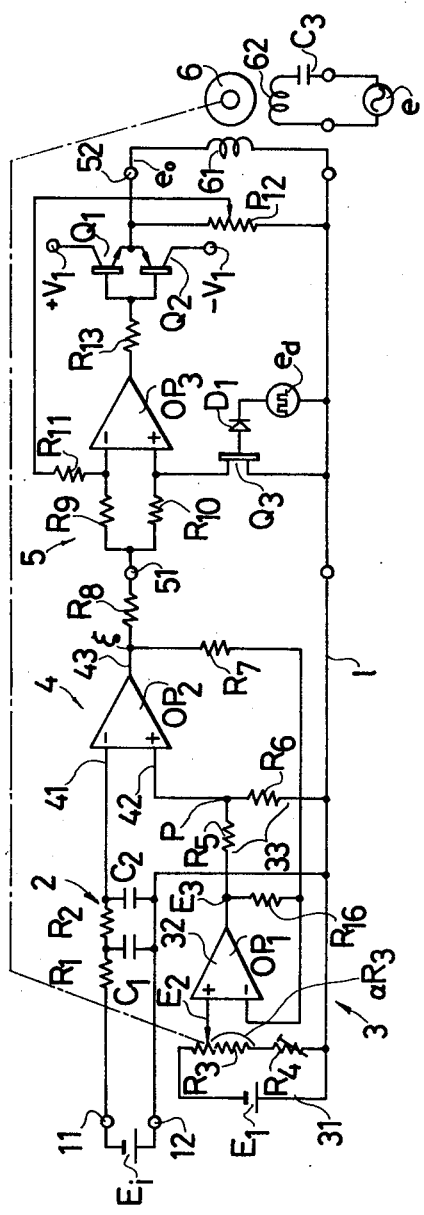

When the dc input signal E$_i$ is based on the common line 1, the loop gain can be made constant irrespective of span adjustment in the following manner. As shown in FIG. 3, the signal input terminal 11 is connected through the resistors R$_1$ and R$_2$ of the filter 2 to the non-inverting input terminal 42 of the dc amplifier 4, and the voltage dividing point P of the voltage divider 33 is connected to the inverting input terminal 41; or, as shown in FIG. 4, the signal input terminal 11 and the voltage dividing point P are connected to the inverted input terminal 41 of the dc amplifier 4 via resistors R$_{14}$ and R$_{15}$ respectively. Further, as shown in FIG. 5, the output $\epsilon$ of the dc amplifier 4 is fed back by way of the buffer amplifier 32 and the voltage divider 33. More specifically, in FIG. 5, the output $\epsilon$ of the dc amplifier 4 is applied through the resistor R$_7$ to the inverting input terminal (−) of the buffer amplifier 32 for which a negative feedback is applied through a resistor R$_{16}$, thus allowing the buffer amplifier 32 to have a gain which depends on the values of resistors R$_7$ and R$_{16}$, and the voltage dividing point P of the voltage divider 33 is connected to the noninverting input terminal 42 of the dc amplifier 4.

Referring to FIG. 1, when the FET Q$_3$ turns on, the noninverting input terminal (+) of the linear IC OP$_3$ is connected to the common line 1. Therefore the output e$_o$ of the servo amplifier 5 to which the output $\epsilon$ of the dc amplifier 4 is applied is given as $$e_o = -m \frac{R_{11}}{R_9} \epsilon \tag{3}$$

where m: voltage dividing ratio of variable resistor R$_{11}$ $$R_{11} >> R_{12}$$

Here the servo amplifier 5 operates as an inverter amplifier. When the FET Q$_3$ turns off, the dc deviation signal $\epsilon$ is applied to the noninverting input terminal (+) of the linear IC OP$_3$. Hence the output e$_o$ of the amplifier 5 is given as $$e_{o=m} \tag{4}$$

Here the servo amplifier 5 operates as a non-inverting amplifier.

Figure 2:
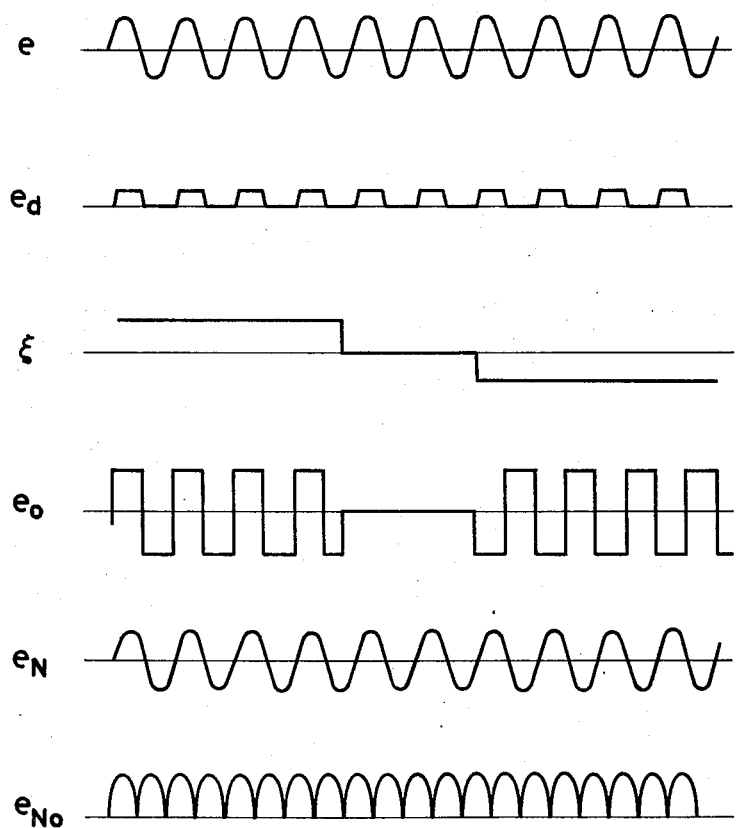
FIG. 2 is a graphic waveform diagram showing operations of the servo-system shown in FIG. 1, the waveforms being depicted with a common horizontal time scale.

FIG. 2 shows a waveform assumed by the output $e_o$ of the servo amplifier 5. As shown, the signal $e_o$ of square square waveform symmetrical with respect to a reference level, swinging in response to on-off of the transistor switch $Q_3$. This square wave signal is identical with the ac power supply voltage e in terms of frequency and has an amplitude and a phase corresponding to the value and the polarity, respectively, of the dc deviation signal $\epsilon$. The signal $e_o$ is supplied to the control coil 61 of the ac servo motor 6, which in turn rotates in the direction dependent on the amplitude and phase of the signal $e_o$, to cause the brush on the slide resistor $R_3$ to be displaced whereby the dc deviation signal is zero-balanced. The displacement $\alpha$ of the brush on the slide resistor $R_3$ is proportional to the dc input signal voltage $E_i$, or expressed as $$\alpha = \frac{R_3 + R_4}{R_3} \cdot \frac{R_5 + R_6}{R_6} \cdot \frac{E_i}{E_1} - \frac{R_4}{R_3} \quad (5)$$

The displacement $\alpha$ is given to the associated indicating recording mechanism where the dc input signal voltage $E_i$ is indicated and recorded. As apparent from Eq. (5), zero adjustment can be made by means of resistor $R_4$ independent of span adjustment. A displacement necessary for zero adjustment depends solely upon the ratio $R_4/R_3$, that is the individual resistances $R_3$ and $R_4$ are not necessarily strictly stable but their ration $R_4/R_3$ is essential.

In the servo-system of the invention, the influence of an ac noise $e_N$ upon the ac servo motor is eliminated. More specifically, assume that an ac noise $e_N$ of power supply frequency passes through the filter 2 and enters the input terminal 51 of the servo amplifier 5 via the dc amplifier 4. In the amplifier 5, the noise $e_N$ is converted into a noise $e_{No}$ whose frequency is twice the power supply frequency as shown in FIG. 2, by on-off action of the swithc $Q_3$, which emerges at the output terminal 52 of the servo amplifier 5. Having a frequency twice the power supply frequency, the noise $e_{No}$ cannot drive the ac servo motor 6.

Although the servo amplifier 5 simply utilizes a linear IC and a transistor switch without depending on the conventional coupling capacitor, it is capable of converting the output $\epsilon$ of the dc amplifier 4 into an ac voltage twice the signal $\epsilon$ in terms of peak-to-peak. As a result, the number of circuit elements can be reduced and the problem of phase shift due to the coupling capacitor is obviated. Furthermore, in the servo-system of the invention, only one switch suffices and hence its drive signal $e_d$ may simply be one derived from the ac power supply e by limiting its amplitude. An example of this arrangement is illustrated in the diagram of a servo-system of the invention in FIG. 6.

Figure 6:
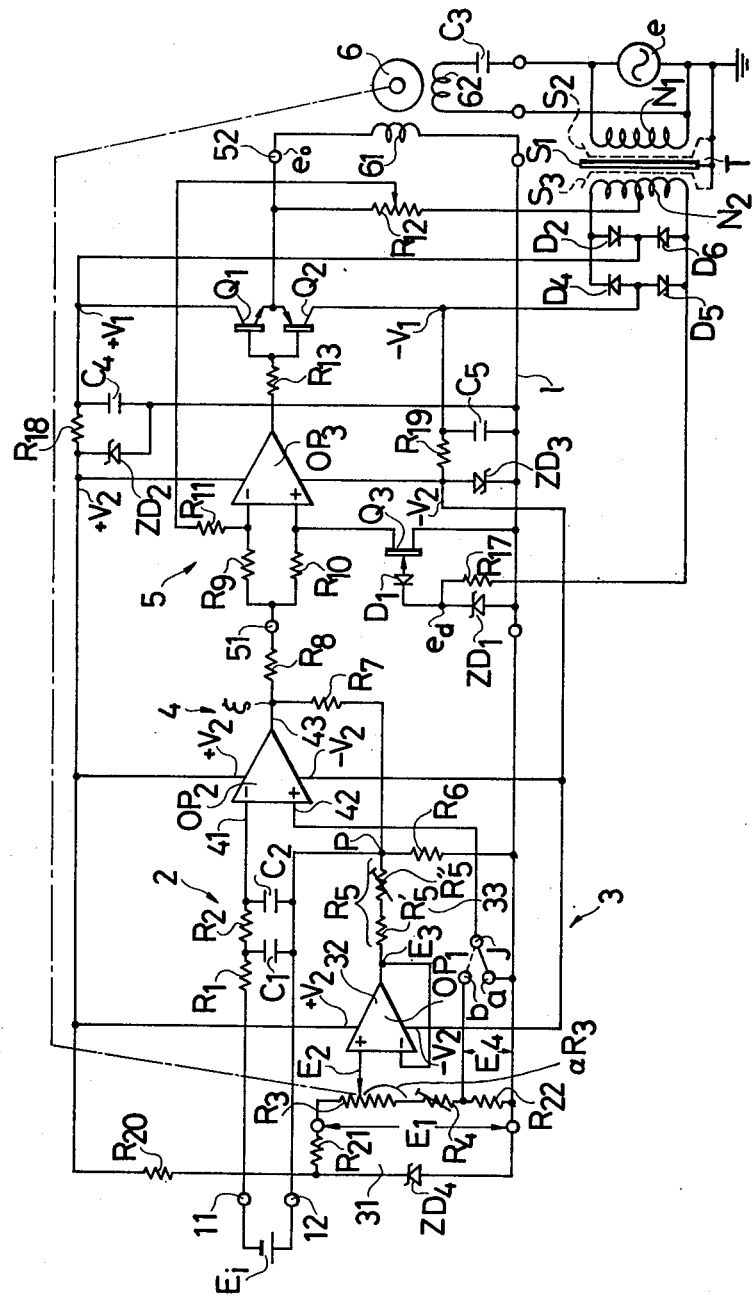
FIG. 6 is a circuit diagram showing a modification in which the switching signal is derived from the ac power supply.

In FIG. 6, a power transformer T has its primary winding $n_1$ connected to an ac power supply e, and the center point of its secondary winding $n_2$ connected to the common line 1. A voltage induced across the secondary winding $n_2$ is clipped by a Zener diode $ZD_1$ through a resistor $R_{17}$, and the resultant half wave, square drive signal $e_d$ is applied to the gate of the FET $Q_3$. The voltage induced across the secondary winding $n_2$ is full-wave rectified through diodes $D_2$, $D_3$, and $D_4$, $D_5$ and then smoothed by capacitors $C_4$ and $C_5$ $+V_1$ and $-V_1$ which are supplied to the collectors of transistors $Q_1$ and $Q_2$ respectively. The dc voltages $+V_1$ and $-v_1$ are stabilized by Zener diodes $ZD_2$ and $ZD_3$ through resistors $R_{18}$ and $R_{19}$. The stabilized dc voltages $+V_2$ and $-V_2$ are supplied to the power supply terminals of linear IC's $OP_1$ to $OP_3$. The positive dc voltage $+V_2$ is stabilized by a Zener diode $ZD_4$ through a resistor $R_{20}$. The resultant dc voltage $E_1$ is applied across a slide resistor $R_3$ via a resistor $R_{21}$. Thus, in this circuit, one secondary winding suffices, permitting the power supply circuit to be simplified. The power transformer T is equipped with a contact preventing plate $S_1$, shields $S_2$ and $S_3$ for precluding hazardous energy from entering the secondary side from the ac power supply.

Figure 7:
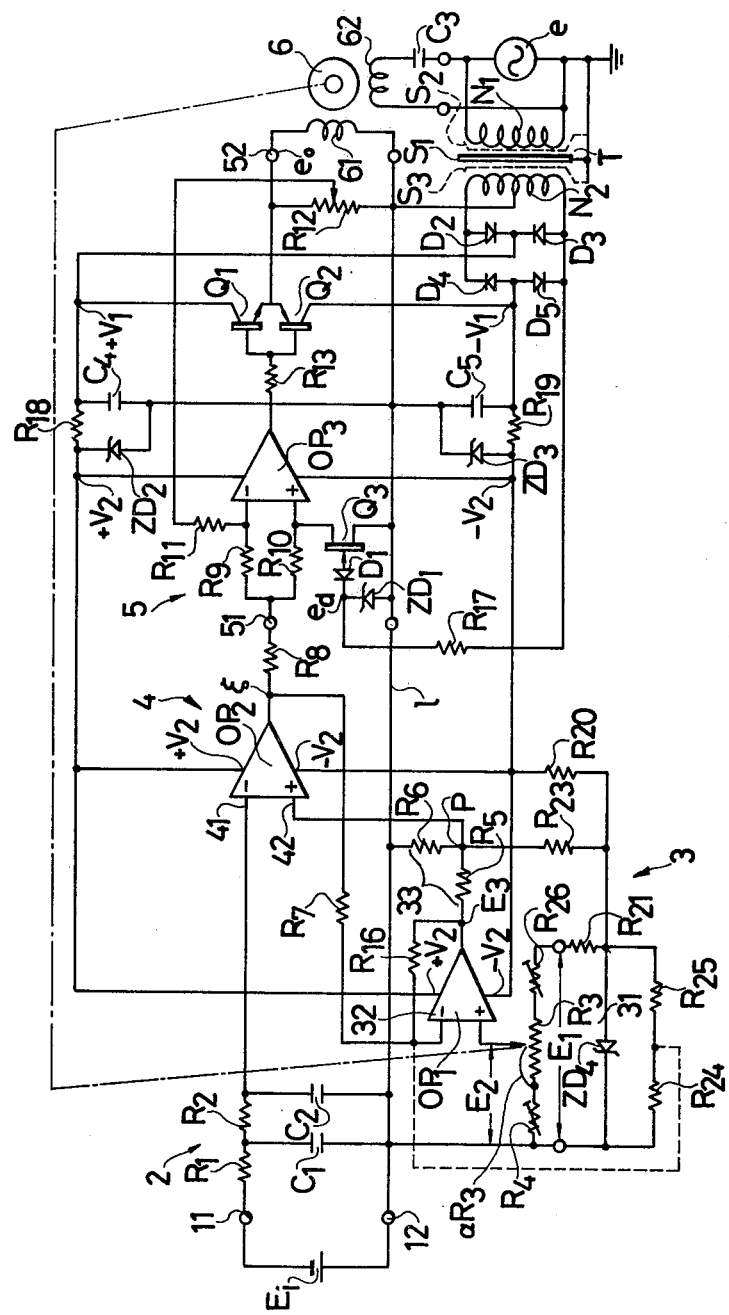
FIG. 7 is a circuit diagram showing a servo system of the invention having fine span adjustment.

In FIG. 6, a resistor $R_{22}$ is connected in series to the zero adjusting resistor $R_4$ of potentiometer 31 so that the non-inverting input terminal 42 of the dc amplifier 4 can be connected by a jumper lead J to the common line or to the junction between the resistors $R_4$ and $R_{22}$. Thus, by adjusting the voltage $E_4$ across the resistor $R_{22}$, the zero point is moved in the positive or negative direction. When the jumper lead J is connected to point a as indicated by the solid line, the zero point is reduced. While, when the jumper lead J is connected to point b as indicated by the dotted line the zero point is increased. When the dc input signal voltage $E_i$ is high, the buffer amplifier 32 needs to have a gain. The output $\epsilon$ of the dc amplifier 4 may be fed back via the buffer amplifier 32 and the voltage divider 33. In such case, a voltage across the Zener diode $ZD_4$ is connected to the voltage dividing point P of the voltage divider 33 through a resistor 23 as shown in FIG. 7 whereby the zero point can be reduced. While, when the voltage across the Zener diode $ZD_4$ is divided through resistors $R_{24}$ and $R_{25}$ and then applied to the inverted input terminal (−) of the buffer amplifier 32 as indicated by the dotted line, then the zero point can be increased.

In FIG. 6, fixed resistor $R_{5'}$ and variable resistor $R_{5''}$ in series are used for the resistor $R_5$ of the voltage divider 33, to enable the span to be finely adjusted by the variable resistor $R_{5''}$. Fine adjustment of span by the variable resistor $R_{5''}$ will cause a slightest change (i.e., a few percent) in the resistance of the resistor $R_5$. In other words, the loop gain $\mu\beta$ of the servo loop can be maintained substantially constant independent of fine span adjustment. Fine span adjustment may be made in the following manner. As shown in FIG. 7 a fine span adjusting variable resistor $R_{26}$ is connected in series to the slide resistor $R_3$, and a current passing through te slide resistor $R_3$ is adjusted.

Figure 8:
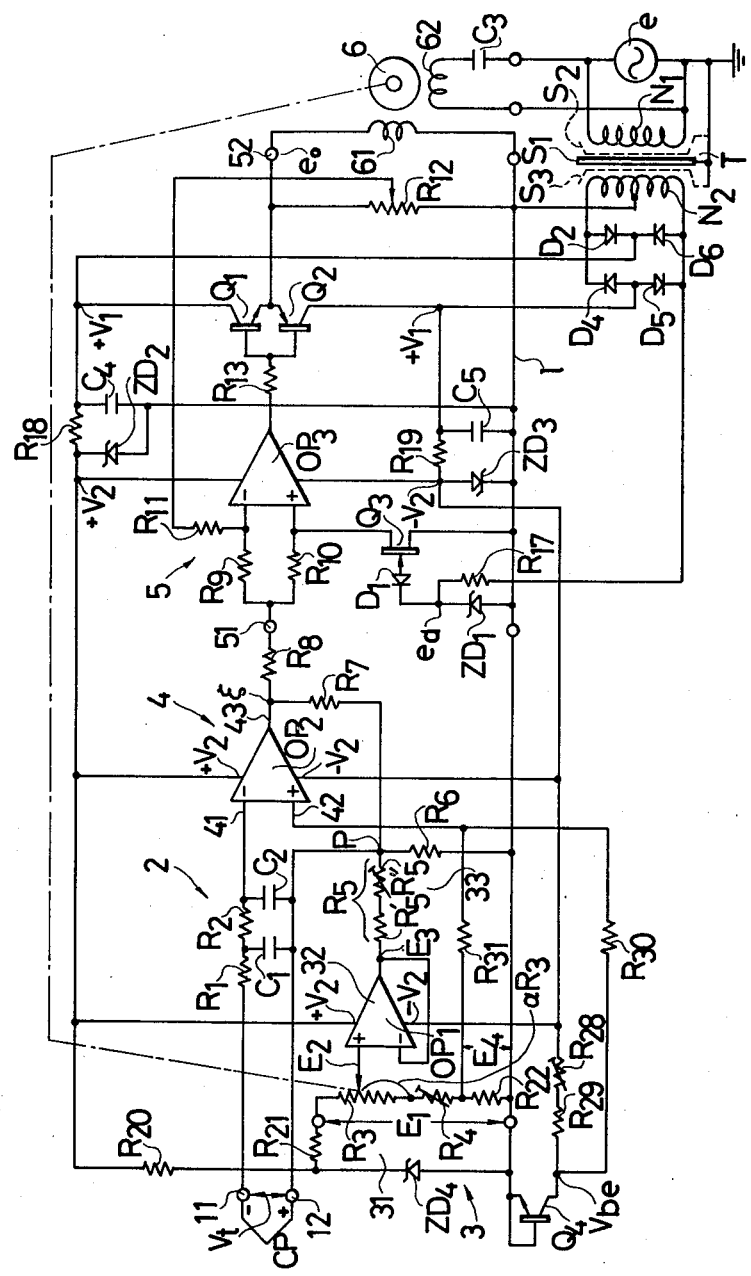
FIGS. 8 and 9 are circuit diagrams showing servo-systems of the invention applied to a thermoelectric thermometer.
Figure 9:
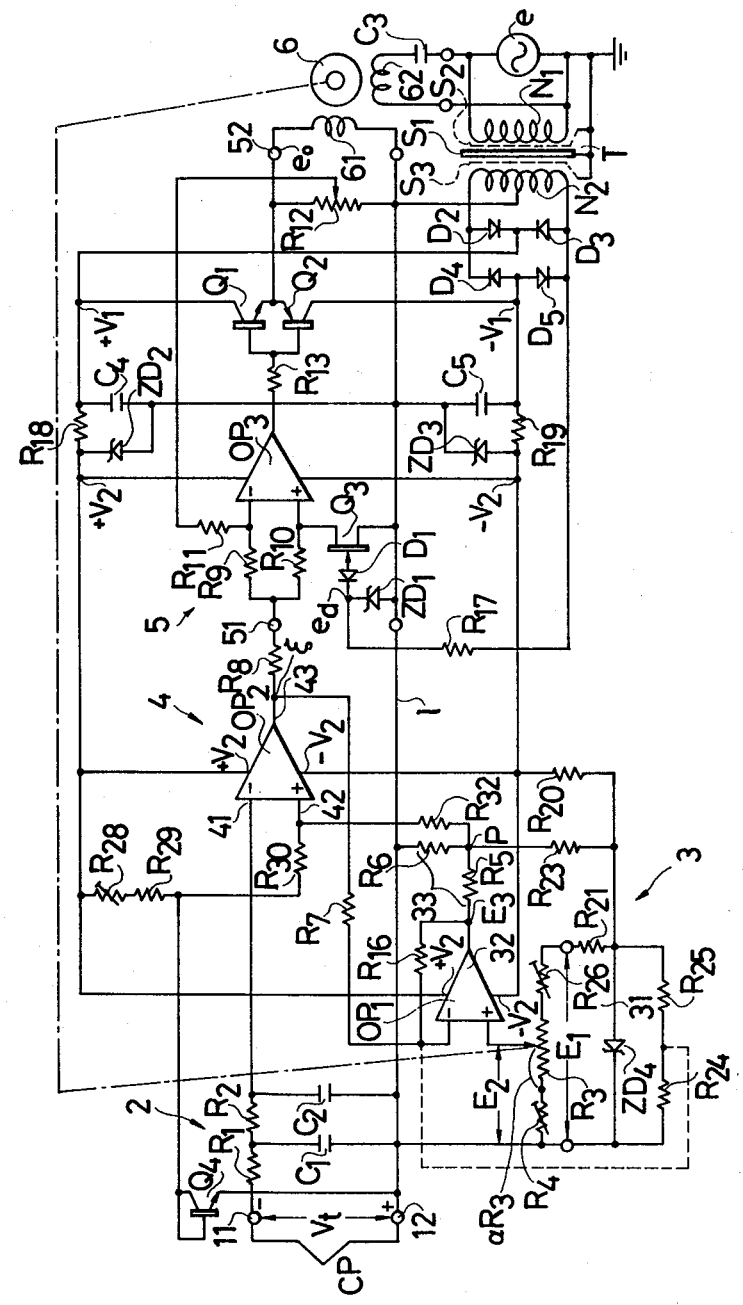

Referring to FIG. 8, there is shown a servo-system of the invention applied to a thermoelectric thermometer, which comprises: a thermocouple CP for detecting the temperature of an object measured, the thermocouple emf $V_t$ being applied across signal input terminals 11 and 12; and a transistor $Q_4$ for detecting the temperature of the cold junction of the thermocouple CP. The transistor $Q_3$ has its base and collector commonly connected to the common line and its emitter supplied with a stabilized negative dc voltage $-V_2$ through resistors $R_{28}$ and $R_{29}$ to allow a given current to flow between the collector and the emitter, the current being dependent upon the dc voltage $-V_2$ and resistances $R_{29}$ and $R_{28}$. The transistor $Q_4$ is such that when a constant current flows between the collector and the emitter, the base-emitter voltage $V_{be}$ is proportional to the temperature of the cold junction at around ordinary temperatures. The voltage $V_{be}$ is applied through a resistor $R_{30}$ to the noninverting input terminal 42 of the dc amplifier 4. A voltage across the resistor R$_{22}$ is applied also to the non-inverting input terminal 42 of the amplifier 4 via a resistor R$_{31}$. Thus the output of the dc amplifier 4 is given as $$\epsilon = \frac{R_5 + R_7}{R_5 R_6} \cdot \qquad (6)$$

$$R_7 \left\{ V_t - E_f + \frac{R_{31}}{R_{30} + R_{31}} \left( \frac{R_{30}}{R_{31}} \cdot E_4 - V_{be} \right) \right\}$$

where $R_5$, $R_6 << R_7$
$R_{31} >> R_{22}$ and $R_{21} + R_3 + R_4$

When the value $R_{30}/R_{31}(E_4)$ is determined to be equal to the value of base-emitter voltage V$_{beo}$ of the transistor Q$_4$, the value $$\frac{R_{31}}{R_{30} + R_{31}} \left( \frac{R_{30}}{R_{31}} \cdot E_4 - V_{be} \right)$$

represents a voltage (i.e., cold junction compensation voltage) which varies linearly with the deviation of the cold junction temperature from a reference temperature. In Eq. (6), the sum of the cold junction compensation voltage and the emf V$_t$ of the thermocouple couple CP is proportional to the temperature at the temperature detecting end. The temperature coefficient vs. the cold junction compensation voltage depends on resistances R$_{30}$ and R$_{31}$ as long as the collector current of transistor Q$_4$ is adjusted so that the ratio of the form constant of the transistor to the collector current of the transistor Q$_4$ is made constant. Therefore this principle holds irrespective of the transistor Q$_4$ used, and this servo-system can easily be adapted to various thermocouples by simply determining the resistance R$_{31}$.

The output $\epsilon$ of the dc amplifier 4 is applied to the ac servo motor 6 through the servo amplifier 5, and the brush of the slide resistor R$_3$ is displaced so that the signal $\epsilon$ is brought to zero. This displacement, therefore, is proportional to the temperature at the detecting end. The displacement $\alpha$ is supplied to the indicating recording mechanism (not shown) where the temperature of the object measured is indicated and recorded.

To feedback the output $\epsilon$ of the dc amplifier 4 through the buffer amplifier 32 and the voltage divider 33, the signal input terminal 12 is connected to the common line 1, and the voltage dividing point P of the voltage divider 33 is connected through a resistor R$_{32}$ to the non-inverting input terminal 42 of the dc amplifier 4.

In the disclosed examples of the servo-system of the invention, a transistor is used as the element for detecting the cold junction temperature. Instead of this element, other temperature detecting elements may be used. The transistor is advantageous in that it is small in size, uniform in characteristics, and variation in temperature coefficient is small; hence it is interchangeable by making but one point temperature calibration against a reference temperature To. Furthermore, the transistor can be installed integral with the cold junction terminal and operate with a small amount of circuit current. In view of circuit construction, therefore, the use of a transistor serves to reduce error and makes accurate cold junction compensation available.

Figure 10:
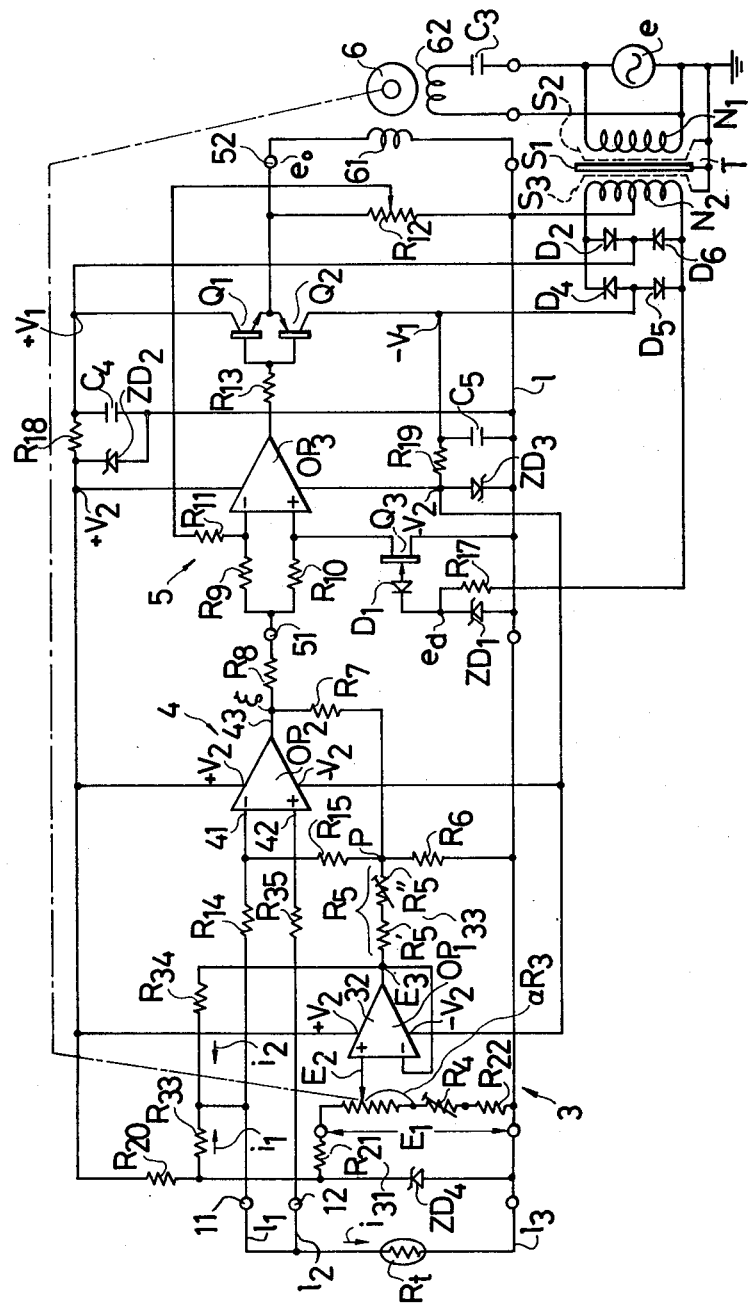
FIGS. 10 and 11 are circuit diagrams showing servo-systems of the invention applied to a resistance thermometer.

FIG. 10 shows a circuit diagram of a servo-system of the invention applied to a resistance thermometer. In FIG. 10, a three-wire platinum resistance bulb R$_t$ has lead wires l$_1$ and l$_2$ connected to signal input terminals 11 and 12, and lead wire l$_3$ connected to the common line 1. The sum of a constant current i$_1$ which depends on the Zener voltage of Zener diode ZD$_4$ and on the resistance R$_{33}$, and a current i$_2$ proportional to the compared voltage which dpends on the output E$_3$ of buffer amplifier 32 and on the resistance R$_{34}$, flows in the resistance bulb through the signal input terminal 11. The signal input terminal 11 is connected to the inverting input terminal 41 of the dc amplifier 4 through a resistor R$_{14}$. The voltage dividing point P of the voltage divider 33 is connected also to the inverting input terminal 41 of the dc amplifier 4 through a resistor R$_{15}$. The signal input terminal 12 is connected through a resistor R$_{35}$ to the non-inverting input terminal 42 of the dc amplifier 4.

In this thermometer circuit, the current i which passes through the resistance bulb R$_t$ does not enter the dc amplifier 4 because this amplifier has a high input resistance. The resistances of the lead wires l$_1$, l$_2$ and l$_3$ of the FILE NAME- FILED06/06/79JOB NAME- 6790103 TERMINAL STATUS- ENTRY BATCH - 41678 OPERATOR CODE- 1MODE- CORR BLK - 0065 resistance bulb R$_t$ are nearly equal to each other. The output $\epsilon$ of the dc amplifier 4 is given as $$\epsilon = \frac{R_5 + R_6}{R_5 R_6} \cdot R_7 \left\{ R_t - E_f + \left( \frac{R_{14} - R_{15}}{R_{14}} \right) ri \right\} \qquad (7)$$

where r is the resistance of the lead wire of the resistance bulb R$_t$.

When the values of the resistors R$_{14}$ and R$_{15}$ are determined so that their resistances are equal to the influence of the resistance r can be obviated regardless of the value of current i which flows in the resistance bulb R$_t$.

Since the current i which is the sum of a constant current i$_1$ and a current $_2(=E_3/R_{34})$ proportional to the compared voltage E$_f$ flows in the resistance bulb R$_t$, the displacement $\alpha$ of the brush on the slide resistor R$_3$ can be expressed as $$\alpha = \frac{R_5 + R_6}{R_6} \cdot \frac{R_t}{1 - \frac{R_5 + R_6}{R_6 R_{34}} \cdot R_t} \cdot \frac{i_1}{E_1} - \frac{R_4 + R_{22}}{R_3} \qquad (8)$$

As apparent from Eq. (8), the displacement $\alpha$ increases with increase in the resistance of the resistance bulb R$_t$, or the displacement $\alpha$ increases linearly with temperature. The displacement $\alpha$ is supplied to the indicating recording mechanism (not shown) where the temperature detected is indicated and recorded. In this servo-system, a voltage proportional to the compared voltge E$_f$ is used to linearize increase in the displacement $\alpha$ with temperature. Accordingly temperature measurement depends solely upon a change in the resistance of resistance bulb itself independent of the lead wire resistance r, permitting span error to be eliminated. As described, the zener diode ZD$_4$ is used to obtain the voltage for supplying a constant current i$_1$ to the resistance bulb R$_t$, with the result that any change in the reference voltage E$_1$ will not lead to measurement error and that zero adjustment can be made independent of span adjustment.

Figure 11:
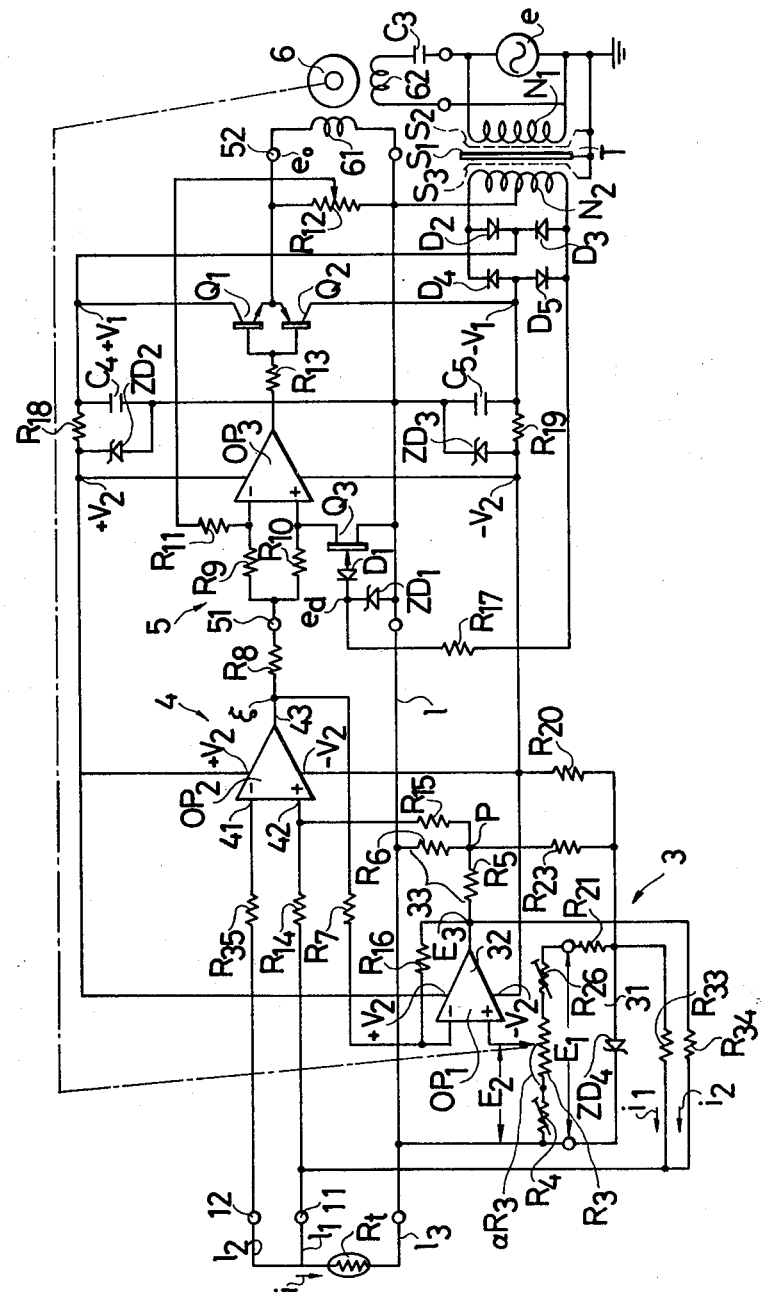

The output $\epsilon$ of the dc amplifier 4 may be fed back through the buffer amplifier 32 and the voltage divider 33 in the following manner. As shown in FIG. 11, the signal input terminal 12 is connected through a resistor $R_{35}$ to the inverted input terminal 41 of the dc amplifier 4, the signal input terminal 11 is connected through a resistor $R_{14}$ to the noninverted input terminal 42 thereof, and the voltage dividing point P of the voltage divider 33 is connected through a resistor $R_{15}$ to the noninverted input terminal 42 thereof.

In this example a platinum resistance bulb $R_t$ is used, of which the resistance increment decreases with temperature. Instead of this resistance bulb, a nickel resistance bulb or the like may be used, of which the resistance increment increases with temperature. In such case, the output $E_3$ of the buffer amplifier 32 needs to be inverted for application to the following stage.

As has been described hereinbefore, the servo-system of the invention operates with stability without using the conventional coupling capacitor and thus obviating problems of phase shift by the capacitor.

We claim:

1. A servo-system for self-balancing use using an ac servomotor with no capacitor coupling comprising:
    input circuit means including means to receive an input signal and means to receive a compared signal, said input circuit means including a direct-coupled dc amplifier capable of comparing and amplifying input and compared signals and further including feed-back signal adjustment means;
    a servo amplifier having a differential direct-coupling amplifier with an inverting input terminal and a noninverting input terminal, said two input terminals being supplied with the output of said input circuit means through individual resistors, and a switch connected between said noninverting input terminal and a common line, said switch being turned on and off in synchronism with an ac power supply;
    amplifier means comprising a pair of complementary transistor connected in series with their emitters in common and their bases driven by the output of said servo amplifier;
    a resistive dividing feedback circuit coupling the common connection of said transistor emitters directly to said inverting input terminal of said servo amplifier, said feedback circuit serving to make the potential at the inverting input terminal become equal to that at the non-inverting input terminal;
    an ac servo motor supplied by said ac power supply, said servomotor being driven by the output of said amplifier means; and
    means for causing said ac servo motor to control said feed-back signal adjustment means to bring the compared value into balance with said input signal.

2. The servo-system as claimed in claim 1 in which said feed-back signal adjustment means is a compared value generator circuit having a potentiometer with a slide resistor,
    said input circuit includes a buffer amplifier for deriving the output of said potentiometer through impedance conversion, and a span adjusting voltage divider for dividing the output of said buffer amplifier; and
    means for applying the output of said dc amplifier to a voltage dividing point of said voltage divider, said dc amplifier being adapted to compare the output of said compared value generator circuit and said input signal and to amplify the compared result.

3. The servo-system as claimed in claim 1 in which said feed-back signal adjustment means is a compared value generator circuit having a potentiometer with a slide resistor,
    said input circuit includes a buffer amplifier for deriving the output of said potentiometer through impedance conversion, and a span adjusting voltage divider for dividing the output of said buffer amplifier; and
    means for applying the output of said dc amplifier to said buffer amplifier, said dc amplifier being adapted to compare the output of said compared value generator circuit and the input signal and to amplify the compared result.

4. The servo-system as claimed in claim 1 including thermoelectric thermometers using thermocouples having hot and cold junctions therein in which said input signal is of an emf from said thermocouple, and including means for detecting the temperature of said cold junction and for applying a voltage corresponding to said detected temperature to said input terminal of the dc amplifier.

5. The servo-system as claimed in claim 4 including a transistor for detecting the temperature of said cold junction of the thermocouple.

6. The servo-system as claimed in claim 1 and adapted for temperature measurement in which said input circuit includes a three-wire resistance bulb; means for connecting through resistors two lead wires thereto on one side to said inverting input terminal and said noninverting input terminal, respectively, of said dc amplifier; means connected between said two lead wires for supplying a current to the resistance bulb; and a means for connecting the voltage dividing point of the voltage divider of the compared value generator circuit to the input terminal of the dc amplifier on the side having the lead wire through which a current is supplied to the resistance bulb.

7. The servo-system for resistance thermometers as claimed in claim 6 including means for supplying said resistance bulb with the sum of a constant current and a current proportional to said compared value to thereby compensate for the nonlinearity of the resistance bulb.

* * * * *

UNITED STATES PATENT AND TRADEMARK OFFICE
CERTIFICATE OF CORRECTION

PATENT NO. : 4,161,678

DATED : July 17, 1979

INVENTOR(S) : Nobuo Kaieda, et al.

It is certified that error appears in the above-identified patent and that said Letters Patent are hereby corrected as shown below:

Column 8, lines 19-22   Delete "FILE NAME- FILED06/06/79JOB NAME-6790103 TERMINAL STATUS- ENTRY BATCH - 41678 OPERATOR CODE- 1MODE- CORR BLK - 0065"

Signed and Sealed this

Twenty-third Day of October 1979

[SEAL]

Attest:

RUTH C. MASON
Attesting Officer

LUTRELLE F. PARKER
Acting Commissioner of Patents and Trademarks